G. BREED.

METHOD OF AND MECHANISM FOR PRODUCING MUSICAL SOUNDS.

APPLICATION FILED DEC. 5, 1911.

2 SHEETS—SHEET 1.

Reissued Jan. 23, 1912.

13,365.

WITNESSES:

Robt. R. Kitchel.

Jos. G. Kenny

INVENTOR

George Breed

BY

Charles N. Butler

ATTORNEY.

G. BREED.

METHOD OF AND MECHANISM FOR PRODUCING MUSICAL SOUNDS.

APPLICATION FILED DEC. 5, 1911.

2 SHEETS—SHEET 2.

Reissued Jan. 23, 1912.

13,365.

WITNESSES:

Robt. M. Kitchel.

Jos. G. Penny Jr.

INVENTOR

George Breed

BY Charles N. Butler

ATTORNEY.

UNITED STATES PATENT OFFICE.

GEORGE BREED, OF PHILADELPHIA, PENNSYLVANIA, ASSIGNOR TO THE LYRACHORD COMPANY, OF NEW YORK, N. Y., A CORPORATION OF NEW YORK.

METHOD OF AND MECHANISM FOR PRODUCING MUSICAL SOUNDS.

13,365. Specification of Reissued Letters Patent. Reissued Jan. 23, 1912.

Original No. 1,007,265, dated October 31, 1911, Serial No. 519,227. Application for reissue filed December 5, 1911. Serial No. 664,281.

*To all whom it may concern:*

Be it known that I, GEORGE BREED, a citizen of the United States, residing at Philadelphia, in the county of Philadelphia and State of Pennsylvania, have invented a Method of and Mechanism for Producing Musical Sounds, of which the following is a specification.

In instruments heretofore devised for electro-magnetically vibrating sonorous members, the means for pulsating the exciting currents have not proven satisfactory for various reasons, among which have been the inability to synchronize the vibrations of the sound-producing bodies and the pulsations of the exciting currents, the inability to establish and maintain a desired phase-relation between the vibrations and pulsations, and also the unreliable, irregular and uncontrollable character of the means for pulsating the currents.

In the preferred form of my improvements, piano strings are positively connected through adjustable auxiliary vibrating members with respective self-adjusting current-pulsators in circuit with electro-magnets which are disposed so that the strings intersect their magnetic fields. The vibrating strings cause forced vibrations of like frequency to be communicated to the pulsators through the auxiliary members which have been adjusted to effect the production of the desired tone-qualities by causing the respective pulsators to act in synchronism with and in the desired phase-relation to the vibrations of the strings.

My leading objects are to provide an improved method and mechanism whereby the vibrations of the sonorous members and the pulsations of the currents exciting the electro-magnets are not only synchronized, but also any requisite phase-relation can be established between the vibrations and pulsations, the quality of the tones can be varied and the actions of the pulsating devices rendered certain.

The further objects are concerned with the details of construction involved in the adaptation of the invention to operation by means of the keys of a musical instrument, as the piano.

Figure 1:
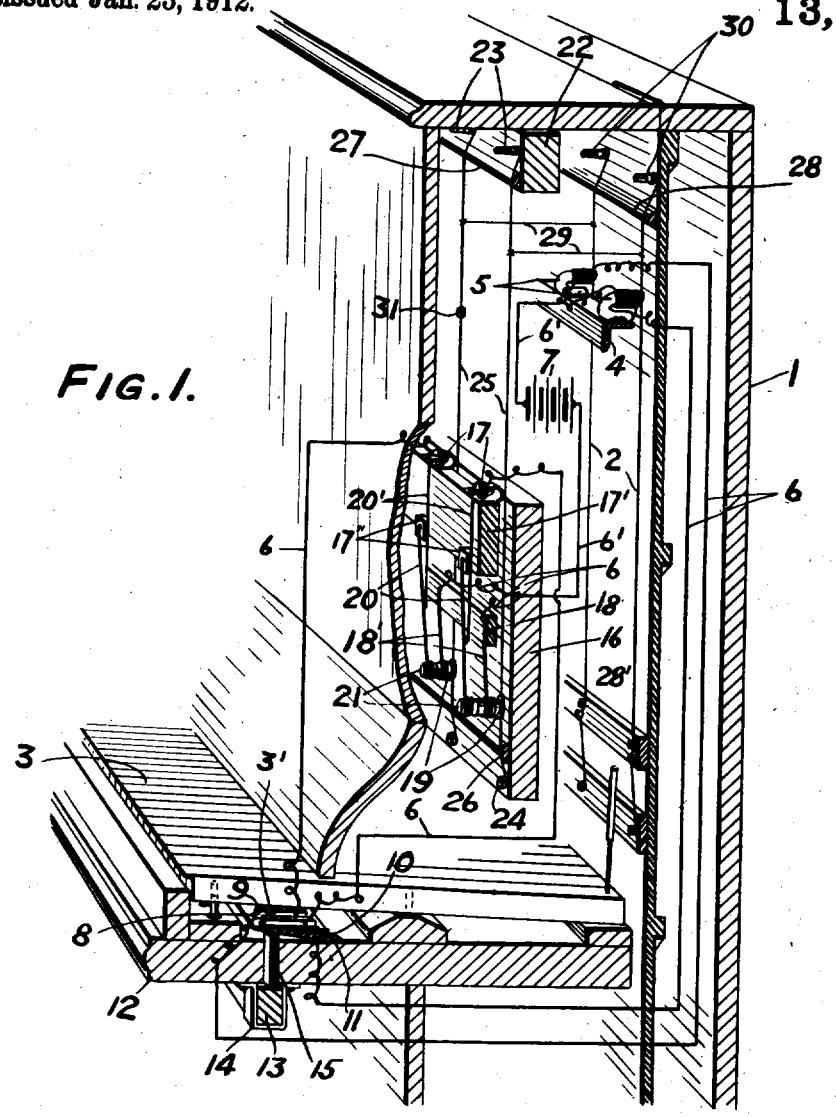
Figure 2:
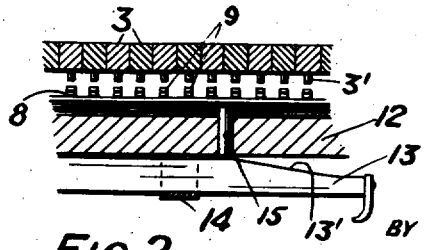
Figure 4:
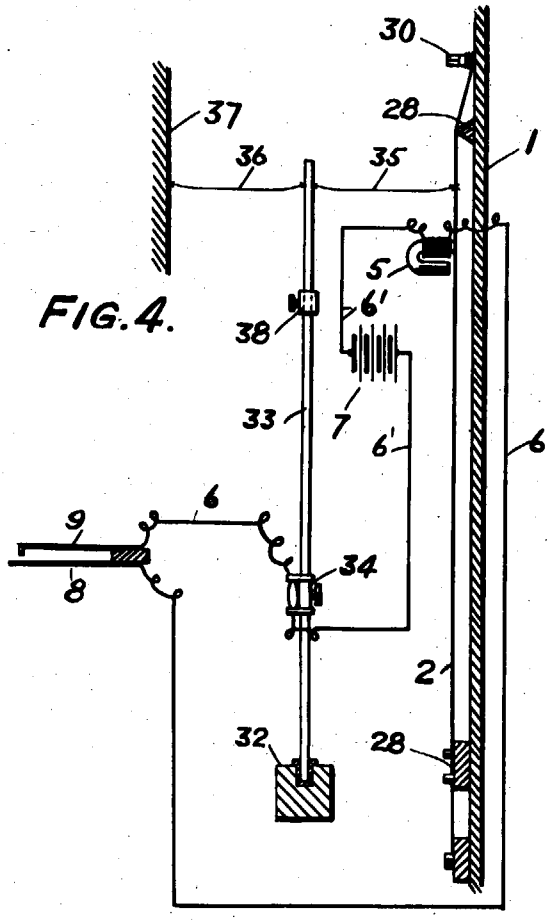
Figure 3:
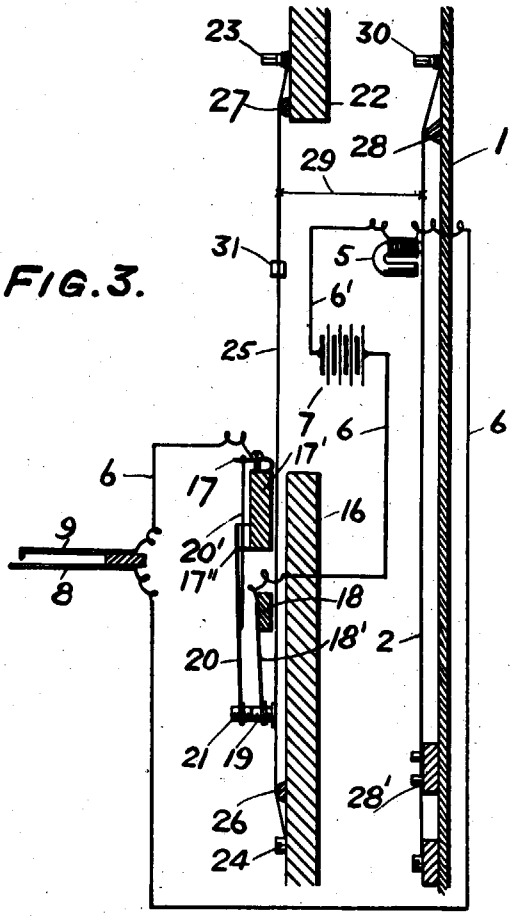

In the accompanying drawings, Figure 1 is a diagrammatic representation of apparatus embodying my invention as applied to a piano shown in section; Fig. 2 is a sectional view taken through the piano-keyboard showing the relation of the keys to switch mechanism used in my invention; Fig. 3 is a diagrammatic view representing a piano-string in combination with a circuit containing a pulsator positively connected with the string and an electro-magnet adapted for attracting the string; and Fig. 4 is a diagrammatic view representing an arrangement similar to that shown in Fig. 3 with modified details.

The invention, as illustrated in the drawings, is applied to a piano 1 having the usual sonorous strings 2 and the keys 3. A bar 4 is placed within the piano, transverse to the strings, and electro-magnets 5 are supported upon the bar so that their fields are intersected by the strings.

The electro-magnets are in the respective circuits 6 which are supplied with current by any suitable source of electric energy, as the battery 7 placed in the common conductor 6′ thereof, and are controlled by any suitable form of automatically opening switches, as the contacts 8 and the resilient contacts 9 adapted to be pressed into engagement with the contacts 8.

The switches are placed beneath the respective keys 3, having lugs 3′ thereon for pressing the contacts 9 into engagement with the contacts 8, and are supported on a bar 10 connected by the hinges 11 with the table 12. A bar 13, having an inclined surface 13′, is movable in a way 14 beneath the table and a bolt 15, movable vertically through the table 12 into contact with the bar 10, rests on the bar 13. Consequently, upon shifting the bar 13 the switches are moved into and out of operative relation to the keys 3, whereby the electrical mechanism is readily thrown into and out of active relation to the instrument.

As illustrated in Figs. 1 and 3, the circuits 6 are provided with pulsators comprising the conductors 18′ supported by the bar 18, the contacts 19 connected with the conductors 18′, the adjustable springs 17 supported by the bar 17′, the conductors 20′ connected with the springs 17, the conductors 20 connected with the conductors 20′ and supported by the brackets 17″ on the bar 17′, and the contacts 21 connected with the conductors 20 and adapted to impinge upon the respective contacts 19. The conductors 20 are resilient and disposed at an angle to the conductors 20′. The conductors 20′ are fine wires adapted to act through the parts 20 to press the contacts 21 against the contacts 19 and to expand under the heating influence of current passing therethrough to permit the parts 20 to withdraw the contacts 21 from the contacts 19 or to regulate the pressure between these contacts.

The piano is provided with the bars 16 and 22 having therein the revoluble pins 24 and 23 between which pass strings or wires 25, the respective bars 16 and 22 supporting bridges 26 and 27 over which the strings 25 are stretched. These bridges are made preferably of felt or other material which will prevent vibrations in the wire sections between them from passing beyond them, thus preventing interferences in the pulsations, as by the passage of vibrations from one to another of the wires 25 through the members 16 and 22. Each string 25 engages or is adapted to engage a contact 19 and communicate its own vibrations thereto. Each string 2 is connected, between its bridges 28 and 28′, by a filament, thread or fine wire 29 with the section of a string 25 between the latter's bridges 26 and 27. Consequently the vibrations of the string 2 are communicated positively through the members 29 and 25 to the contact 19. The time occupied by the impulses in passing from the piano string 2 along the thread 29 and along the wire 25 to the contact 19, may be decreased or increased by altering the tension of the wire 25 by means of the tuning pins 23 so as to cause the magnetic impulses to be given to the string at the particular instant which is necessary in order that it may produce the desired quality of tone.

It will be understood that the instantaneous value of the current passing between the carbon contacts 19 and 21 and hence the current passing through the electro-magnets 5, is determined at any instant by the pressure of the contacts 19 and 21 and this pressure is varied in correspondence with vibrations communicated to the contacts through the member 25. It is found that as the tension of the member 25 is varied by turning the pins 23 the quality of the tone is changed and thereby a required tone can be produced, such tone resulting from the establishment by the adjustment described of the required phase-relation.

A weight 31, as a piece of cork or rubber, may be placed on and adjusted along the string 25 to modify its vibrations, it being found that objectionable overtones may be suppressed and irregular actions of the pulsator may be corrected by damping the vibrations.

As illustrated in Fig. 4, the piano contains the bar 32 which supports rods 33 corresponding to the strings 25 and adjustable on the rods are the pulsators 34 in the circuits 6. The strings 2 and corresponding rods 33 are connected by strings or filaments, as silk threads 35, and these rods may be connected by the further strings, as silk threads 36, with a stationary member 37 on their opposite sides from the strings 2. The vibrations of the strings 2, induced by the excitations of the electro-magnets 5 when the contacts 8 and 9 are engaged, are communicated through the strings 35 and rods 33 to the pulsators 34, whereby the current is pulsated in synchronism with the vibrations of the sonorous strings. By adjusting the position of a pulsator 34 upon its rod 33 the quality of the tone can be altered, as previously described, and by means of a weight 38, adjustable upon the rod, overtones can be controlled and the action of the pulsator modified.

In the foregoing operations, the sonorous members are electro-magnetically vibrated, the vibratory action is transmitted mechanically and positively through the auxiliary vibrating means to the corresponding pulsators in the circuits containing the respective electro-magnets; and the respective transmitting mechanisms are adjustable and adapted for producing the required phase-relation between the magnetic impulses and the vibrations of the sonorous members.

Having described my invention, I claim:

1. The method of producing desired musical sounds which consists in electro-magnetically vibrating a sonorous member, pulsating the exciting current by forced vibrations, and adjusting the forced vibrations to produce the required phase-relation between the magnetic impulses and the vibrations of the sonorous member.

2. The method of producing musical sounds which consists in electro-magnetically actuating vibratory sonorous members and pulsating the respective exciting currents by forced vibrations induced by the vibrations of the respective sonorous members and having a required phase-relation to the respective magnetic impulses.

3. The method of producing musical sounds which consists in electro-magnetically actuating vibratory sonorous members, and pulsating the respective magnetic forces actuating said sonorous members by forced vibrations independently adjusted to the required phase-relation between the vibrations of the sonorous members and the respective magnetic impulses.

4. The mechanism for producing musical sounds which comprises the combination of a sonorous member, with a circuit containing an electro-magnet adapted to actuate said member and a pulsator adapted to pulsate the current, and means comprising a vibratory member connected with said pulsator, and a member connecting said vibratory member with said sonorous member, whereby said pulsator is operated.

5. The mechanism for producing musical sounds which comprises the combination of a musical string, with a circuit containing an electro-magnet adapted to actuate said string and a pair of contacts adapted to pulsate the exciting current, a vibratory member connected with one of said contacts, means for regulating the vibratory action of said member, and a flexible connection between said string and member.

6. The mechanism for producing musical sounds which comprises the combination of a musical string, with a circuit containing a current pulsator and an electro-magnet adapted for vibrating said string, a vibratory member connected with and adapted to vibrate a member of said pulsator, a string connecting said member and said musical string, and means for adjusting the vibratory action of said member and thereby regulating the action of said pulsator member.

7. The mechanism for producing musical sounds which comprises the combination of a musical string, with a circuit containing a current pulsator and an electro-magnet adapted for vibrating said string, a string connected with and adapted for vibrating said pulsator, and a string connecting said strings.

8. The mechanism for producing musical sounds which comprises the combination with a musical string, of a circuit containing a pulsator and an electro-magnet for vibrating said musical string, connected with said pulsator a string having means for varying its tension and means for connecting said strings whereby the vibrations of said musical string are communicated to the string connected with said pulsator.

9. The mechanism for producing musical sounds which comprises the combination with a vibrating sonorous member, of a circuit containing a pulsator and an electro-magnet for vibrating said sonorous member, a string connected with and adapted for vibrating said pulsator, means for supporting said string and limiting its section subject to vibration, and means connecting said member and string.

10. The mechanism for producing musical sounds which comprises the combination with a vibrating sonorous member, of a circuit containing a pulsator and an electro-magnet for vibrating said sonorous member, a string connected with and adapted for vibrating said pulsator, soft bridges over which said string is drawn, and means for connecting said sonorous member with said string between said bridges.

11. The mechanism for producing musical sounds which comprises the combination of a musical string, with a circuit containing a current-pulsator and an electro-magnet for vibrating said string, means whereby forced vibrations are communicated from said string to said pulsator, and adjustable means for modifying the vibratory action of said means.

12. The mechanism for producing musical sounds which comprises the combination of a musical string, with a circuit containing a current-pulsator and an electro-magnet for vibrating said string, means whereby forced vibrations are communicated from said string to said pulsator, and an adjustable weight for modifying the vibratory action of said means.

In witness whereof I have hereunto set my name this 17th day of November, 1911, in the presence of the subscribing witnesses.

GEORGE BREED.

Witnesses:
CHARLES N. BUTLER,
JOS. G. DENNY, Jr.